United States Patent [19]

Metraux

[11] Patent Number: 5,012,848
[45] Date of Patent: May 7, 1991

[54] ANTISKID DEVICE

[75] Inventor: Michel Metraux, Pully, Switzerland

[73] Assignee: Autotyp S.A., Etagnieres, Switzerland

[21] Appl. No.: 379,049

[22] Filed: Jul. 13, 1989

[30] Foreign Application Priority Data

Jul. 13, 1988 [CH] Switzerland ............ 2679/88-2

[51] Int. Cl.$^5$ .............................. B60C 27/20
[52] U.S. Cl. .................. 152/218; 152/225 R; 280/757
[58] Field of Search ............ 152/216, 213, 210, 218, 152/217, 208, 219, 221, 222, 223, 225; 280/757

[56] References Cited

U.S. PATENT DOCUMENTS

| 3,120,256 | 2/1964 | Sekelsky | 152/218 |
| 4,244,412 | 1/1981 | Seggio | 152/218 |
| 4,338,988 | 7/1982 | Brooks et al. | 280/757 |
| 4,388,754 | 6/1983 | Ilon | 29/446 |
| 4,751,975 | 6/1988 | Rieger et al. | 280/757 |
| 4,800,939 | 1/1989 | Torneback | 280/757 |

FOREIGN PATENT DOCUMENTS

| 0007297 | 1/1980 | European Pat. Off. . |
| 0288882 | 11/1988 | European Pat. Off. . |
| 0298906 | 1/1989 | European Pat. Off. . |
| 3545528.4 | 7/1987 | Fed. Rep. of Germany . |
| 8811805 | 12/1988 | Fed. Rep. of Germany . |
| 1051990 | 1/1954 | France . |
| 2492744 | 4/1982 | France . |
| 0125251 | 4/1928 | Switzerland . |

Primary Examiner—Richard A. Bertsch
Attorney, Agent, or Firm—Foley & Lardner

[57] ABSTRACT

An antiskid device is provided for a vehicle wheel comprising a detachable antiskid rolling track on the periphery of the wheel, a central housing for holding radial linking elements or arms which are also attached to chain guides inserted in said rolling track, and a return member designed to automatically position the rolling track and hold it on the periphery of the wheel. The rolling track comprises resilient elements capable of eliminating the play between the peripheral surface of the tire and said antiskid rolling track.

36 Claims, 5 Drawing Sheets

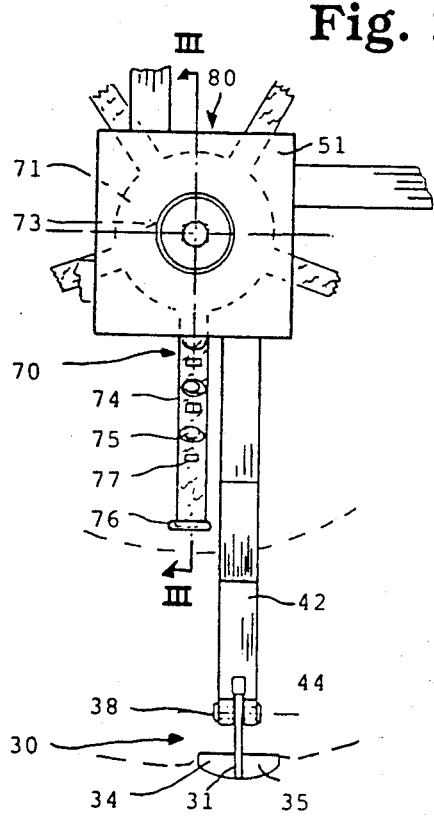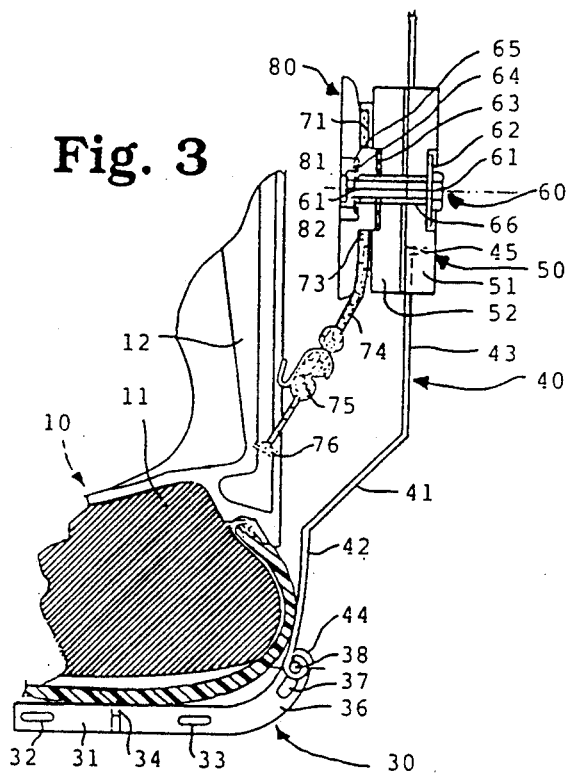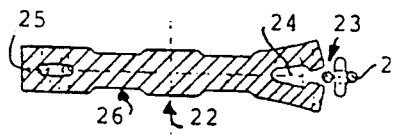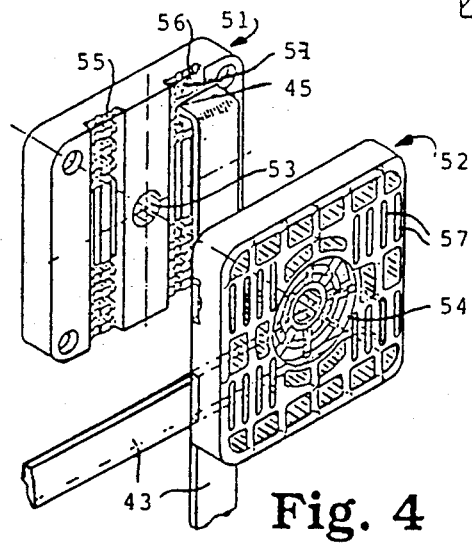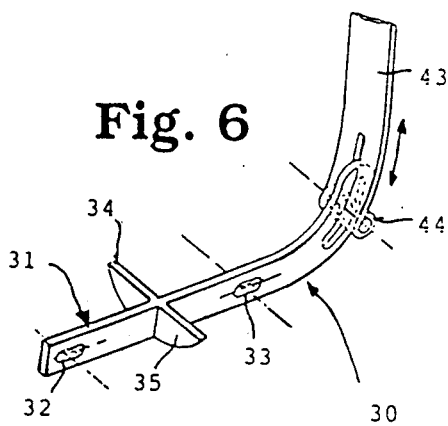

ANTISKID DEVICE

BACKGROUND OF THE INVENTION

1. Field of the Invention

The present invention relates to antiskid devices for wheels and, more particularly, to snow-chain type assemblies for vehicle wheels.

2. Discussion of the Related Art

Everyone is aware of the problems encountered by the driver who is forced to equip his vehicle with chains on the berm of a road and often in bad atmospheric conditions. In order to avoid this difficult fitting, automatic systems for positioning antiskid devices have previously been proposed.

French Patent No. 2,492,744, for example, describes an antiskid device for a vehicle wheel comprising a return member designed to automatically position a chain or detachable antiskid rolling track on the periphery of the wheel and to hold it there.

Because of the relative movement of the chain with respect to the peripheral surface of the tire, it is desirable to mount the return member so as to rotate with respect to a central housing for fastening radial linking elements or arms which are indirectly attached to said rolling track. A system of this type is described in European Patent Application No. 87115502.4 of the Applicant, and which corresponds to U.S. Pat. No. 4,922,982, which more particularly relates to a return member and its assembly with respect to the central housing.

In this construction, use is made, moreover of articulation elements disposed between the chain and the arms in order to enable any deformations, which occur in the rolling track as it strikes the ground, to be followed. Such a deformation of the rolling track involves a pivoting with respect to the tangent to the wheel. The necessary articulation creates a point of weakening of the system, which is, of course, undesirable.

In German Patent Application No. P 35 45 528.4 of the Applicant, a description is given more particularly of bent arms which make it possible to ensure that the outer part of each arm is close to the tire, in an operating position, while allowing the tire to expand when a load is applied. The arms are also slidable with respect to the central housing in order to allow adjustment of the device with respect to the dimensions of the wheel to be equipped and to eliminate the deformation of the tire when the latter comes into contact with the ground.

With regard to the rolling track itself, chains are usually attached to holding elements intended to position the chains with respect to the tire. In these constructions, the holding elements are either directly fixed to intermediate chain segments or have passages for the latter.

It has also been previously proposed to construct the rolling track using shaped elements made from flexible material which are joined to intermediate chain links. Even if the surface of the flexible elements is large with respect to the length of the intermediate chains, the term "snow chains" is still usually applied.

Systems of this type require an adjustment of the length of the antiskid rolling track, which adjustment is carried out by the user acting on the length of a chain segment whose number of links may be altered.

A disadvantage of the known systems is the additional noise caused by the antiskid devices.

SUMMARY OF THE INVENTION

The object of the present invention is to provide an antiskid device wherein play is eliminated between the peripheral surface of the tire and the surface of the antiskid device.

A further object of this invention is to provide an antiskid device wherein there is no twisting of the bars connecting the skid chains when the ground and the wheel are in contact.

Yet a further object of the invention is to eliminate noise.

The foregoing and additional objects are attained by providing an antiskid device for a vehicle wheel comprising a detachable antiskid rolling track on the periphery of the wheel, a central housing for holding radial linking elements or arms which are also attached to chain guides inserted in said rolling track, and a return member designed to automatically position the rolling track and hold it on the periphery of the wheel. The rolling track comprises resilient elements capable of eliminating the play between the peripheral surface of the tire and said antiskid rolling track.

In a first preferred embodiment, the rolling track comprises at least two circles of chains disposed on either side on the rolling surface and bars placed transversely and at regular intervals along the track. In an alternative embodiment, the resilient elements consist of springs (such as a helical spring, spring leaf or resilient ring) inserted between two adjacent bars.

In another envisaged embodiment, the resilient elements consist of flexible plates which constitute the rolling track. These plates have inner cutouts intended to create oblique tongues and have ribs intended to ensure grip with the ground. Each plate also includes means for linking to the adjacent element. In another embodiment, it is possible to use rigid plates separated by resilient linking elements.

Further objects and advantages of the invention will become apparent in the specification and drawings which follow.

BRIEF DESCRIPTION OF THE DRAWINGS

FIG. 2 is a view similar to FIG. 1, showing the detail of a central housing, of an arm and of a chain guide;

FIG. 3 is a sectional view according to the axis III—III in FIG. 2, partially showing the vehicle wheel equipped with the device having a central housing, an arm, a chain guide and a return member;

FIG. 4 is an exploded perspective view of the two shells forming the central housing with a partial representation of the positioning of two arms;

FIG. 5 is a sectional view of a bar, showing, on one side, the positioning of a chain link and, on the other, a fixed link;

FIG. 6 is a perspective view of a chain guide being linked to an arm;

DETAILED DESCRIPTION OF THE PREFERRED EMBODIMENTS

Figure 1:
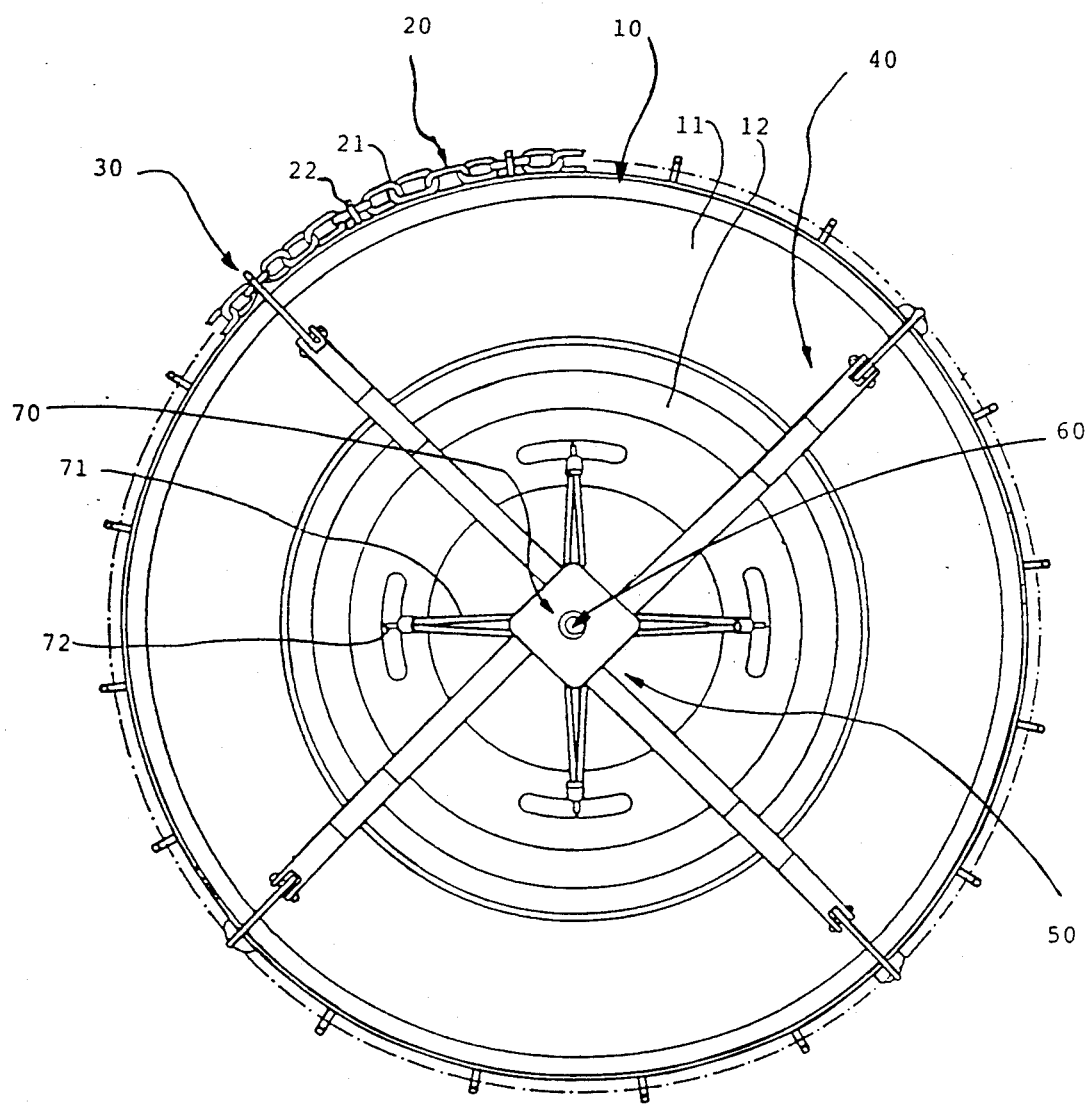
FIG. 1 is a side elevated view of a vehicle wheel equipped with a device according to the present invention, showing the various components diagrammatically.

Referring to FIG. 1, the present invention contemplates an antiskid device which is to be attached to a wheel 10 of the vehicle. The wheel 10 comprises conventionally a tire 11 and a wheel rim 12 fixed in a known manner to the axle of the vehicle.

On the periphery of the tire 11 is shown the rolling track, indicated by the general reference numeral 20, and which comprises, in a known manner, chain links 21 which are spaced by means of bars 22. The rolling track 20 also comprises at least four elements 30 called chain guides which have a specific general shape which will be described in detail below.

The chain guides 30 are attached, moreover, to arms 40 which are usually disposed substantially in the shape of a cross from a central housing 50 which is mounted on a shaft 60. A return member 70 is designed to automatically position the rolling track 20 on the wheel 10 and to hold it thereon. The components of the return member 70, which can be seen in FIG. 1, include resilient tensioning elements 71 and hooks 72 for fastening to the wheel rim 12 of the vehicle. The hooks 72 are metallic and are generally plasticized or made from stainless steel.

Referring now to FIGS. 2 and 3, which show the construction in more detail, it will firstly be noted that the rolling track 20 is not shown, so that the drawing is clear. These figures show again the wheel 10 of the vehicle as well as its tire 11 and its wheel rim 12. One of the chain guides 30 may also be seen, one side of which comprises, as seen in FIG. 3, a substantially flat part 31 intended to lie against the tread of the tire 11 in the transverse direction. The flat part 31 of the chain guide 30 comprises two oblong openings 32 and 33 which are intended for the passage of the chain links 21 of the rolling track 20. The flat part 31 also comprises, in a preferred embodiment, two shoulders 34 and 35 located on either side of the chain guide 30, substantially at the center of the rolling track. It should be noted that the height of the shoulders 34 or 35 is greater than or equal to the thickness of the rolling track 20.

The drawing shows a chain guide with two shoulders located opposite each other; however, it is, of course, possible to modify the number of shoulders and to dispose them in an offset manner.

The end of the chain guide 30 opposite the flat part 31 is terminated in an arcuate part 36, intended to match the rounded shape of the tire 11, and equipped with an oblong opening 37 for the passage of a spindle 38 for linking to one of the arms 40. The linking spindle 38 may, according to the alternative embodiments, consist of a pin, a rivet or a screw and nut assembly or any other means fulfilling the same function.

Each of the arms 40 comprises a metallic bar of preferably rectangular section having a central part 41 inclined in the direction of the tire and extended by two parts 42 and 43 which are bent with respect to the central part 41 and which are substantially parallel to the plane of the wheel.

The outer bent part 42 ends in a circular curving portion 44 intended to form a sleeve around the pin 38 for linking to the chain guide. In order to ensure the solidity of the assembly, the folded end 44 may be spot welded. Of course, the shape of the outer part 42 will be such that the arm does not rub against the tire when the vehicle is moving. Preferably, the outer part 42 will have a slight curvature intended to match the outer shape of the tire.

The inner bent part 43 is generally straight and ends in a substantially right-angled curving 45 for fastening the arm in the central housing 50, which, as will be seen in detail below, consists of two shells 51 and 52 having a central passage for the shaft 60.

As may be seen in FIG. 3, the central shaft 60 comprises a screw 61 passing through, in succession, an outer washer 62, the shells 51 and 52 of the central housing 50, a central washer 63, the central disk 71 of the resilient member 70, a return plate 80 and an inner washer 64 before engaging with a nut 65. It will also be noted that, between the head of the screw 61 and the nut 65, there is a sleeve 66.

As has already been mentioned, the device is completed by a resilient return member 70 comprising a central disk 71 having a central opening 73 and radial extensions 74 equipped with reinforcements 75. In a preferred alternative embodiment, each extension 74 ends in a gripping member 76 intended to facilitate introduction of the hook 72 between one of the openings 77 made in the extension 74 and openings or edges of the wheel rim 12 of the vehicle.

The return plate 80 is circular and has, in FIG. 3, a recess 81 of a dimension which corresponds to that of the inner washer 64 and to the nut 65 on the vehicle wheel side. On the opposite side, the plate comprises a cylindrical shoulder 82 of a dimension corresponding to an opening made in the central disk 71.

FIG. 4 is an exploded view of the shells 51 and 52 constituting the central housing 50. Each shell 51, 52 has a central opening 53 for the passage of the screw 61 and of its sleeve 66. On one face each shell 51, 52 comprises a circular recess 54 for one of the washers 62 or 63 and, on the opposite face, two straight grooves 55 and 56 ensuring the passage of the inner part 43 of the arms 40. Each groove 55, 56 has a series of parallel lateral recesses 57 intended to receive the curving 45 made at the end of the arm 43. In the alternative embodiment represented in the drawing, recesses 57 go all the way through the shell 51, 52. In a preferred embodiment, the shells 51 and 52 are square and identical and may be assembled such that their grooves are perpendicular in the operating position in order to permit the assembly of the four arms in the shape of a cross.

FIG. 5 shows one of the bars 22 constituting a rolling track 20 as represented in FIG. 1. The bars 22 are metallic plates. The righthand part of the drawing shows the profile which is obtained by stamping. An end passage 23 is extended by an opening 24 intended to receive a chain link 21. In the lefthand part of the drawing, the link 21 is in position and a weld 25 fastens the link 21. It will be noted that, on the side, the bars 22 have grooves 26 whose purpose will be indicated below.

FIG. 6 is detail showing the chain guide 30 fastened to the end of the outer part 43 of the arm 40. As described above, the circular curving 44 forming a sleeve is intended for the passage of the pin 48 for linking to the chain guide 30. The openings 32 and 33 may be seen in this figure, which openings are intended for the passage of chain links as well as the shoulders 34 and 35 disposed on either side of the flat part 31. In the alternative embodiment shown, it will be noted that the ends of the shoulders 34, 35 are pointed, whereas they are truncated in FIG. 2. As will be seen below, the important thing is to have at least one shoulder 34 or 35 in the transverse direction with respect to the chain guide. The arcuate part 36 of the chain guide is intended to match the rounded form of the tire and has an opening 37 in the shape of an arc of a circle for the passage of the pin 38 for linking with the sleeve 44.

Figure 7:
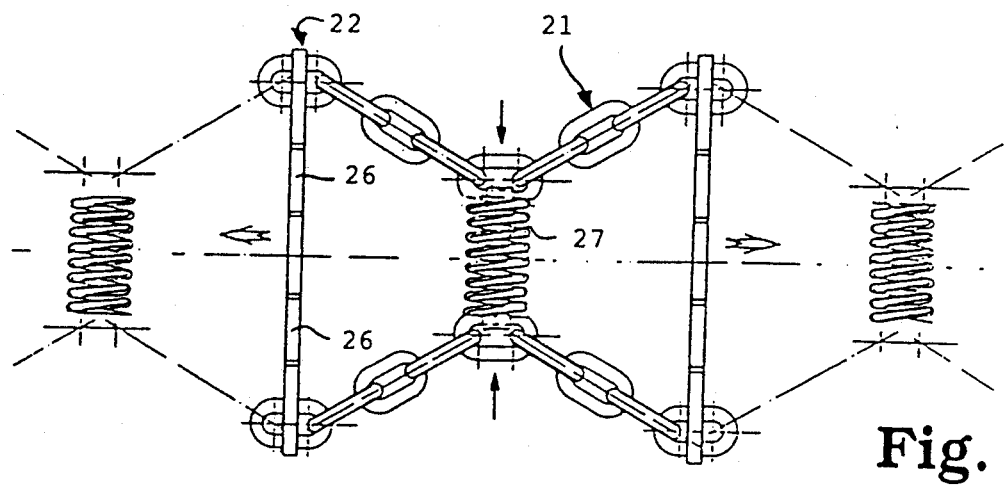
FIGS. 7 to 9 are various types of rolling track according to the invention whose resilience is determined respectively by a traction helical spring, by a resilient ring, and by a spring leaf for separating or closing.
Figure 8:
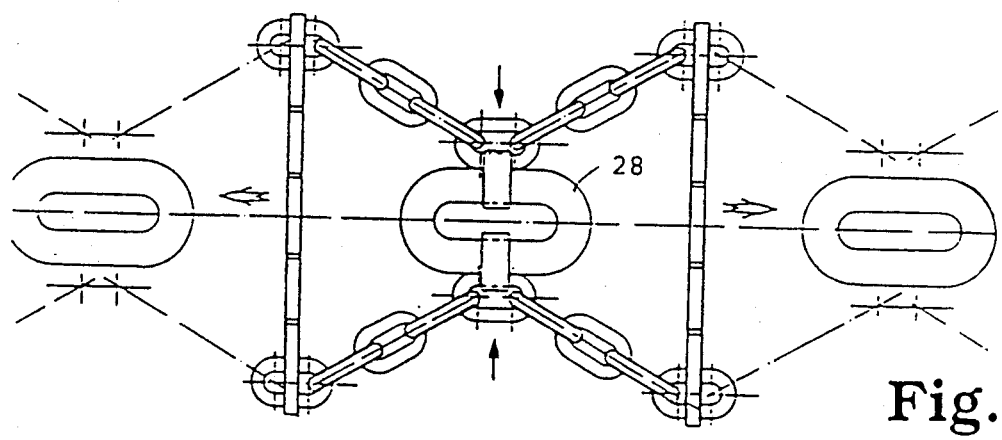
Figure 9:
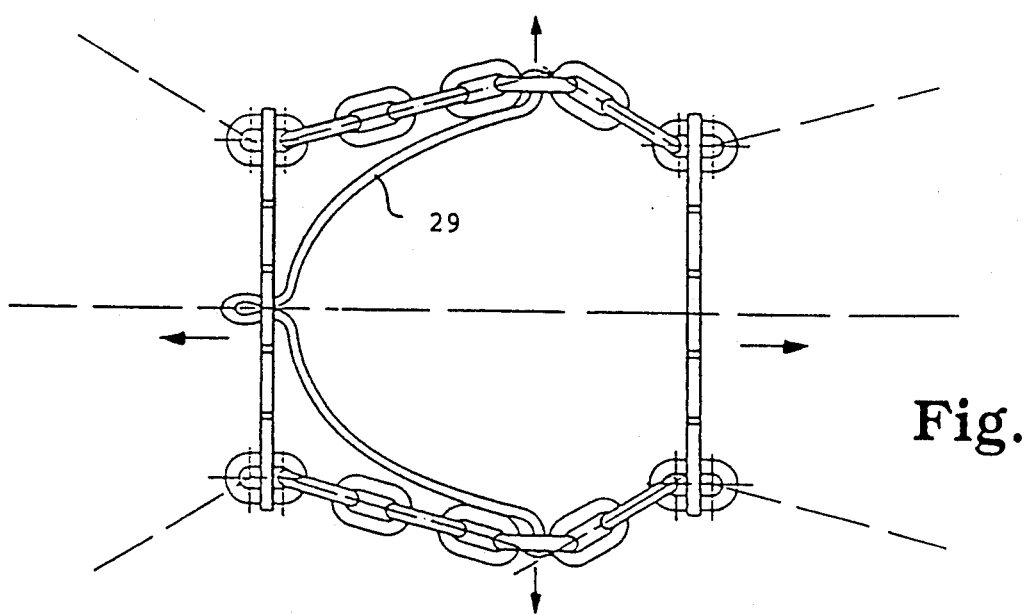

In the partial representation of rolling tracks in FIGS. 7 to 9, there may be seen again the bars 22, seen from the side, with their grooves 26 as well as the chain links 21. As will be seen below, the rolling tracks must have a certain resilience, which may be obtained in a number of ways.

By way of example, helical springs 27 are used in FIG. 7, rubber rings 28 are proposed in FIG. 8, and the embodiment shown in FIG. 9 employs spring leaves 29.

These resilient means are disposed in these representations between two adjacent bars 22. According to the embodiments, the springs may be metallic or plastic, made from rubber or synthetic material. The choice will depend upon which materials have characteristics, from the point of view of resilience which are satisfactory in extremely cold conditions.

Figure 10:
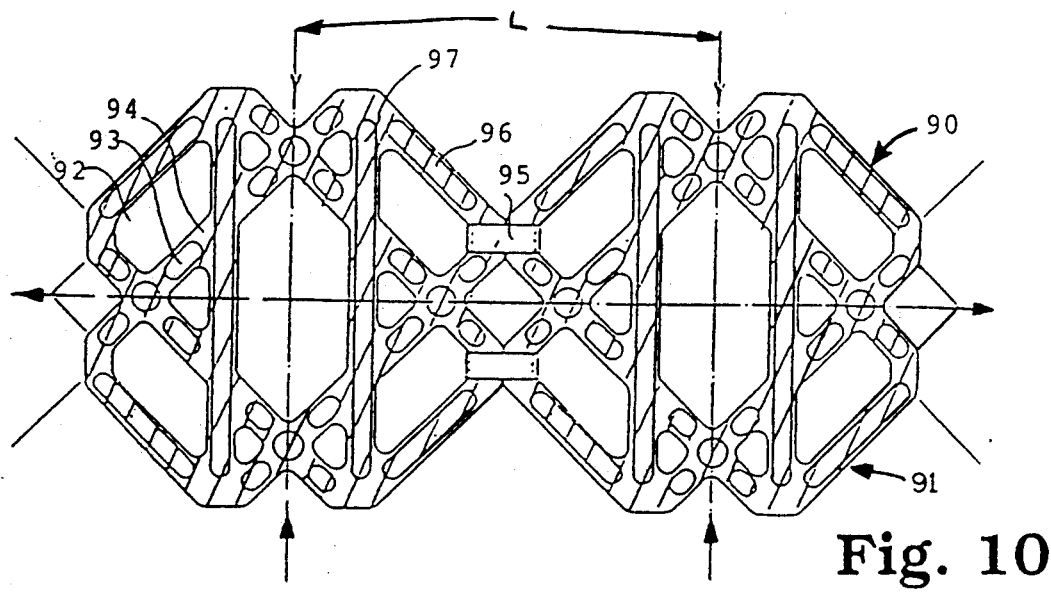
FIGS. 10 and 11 are alternative embodiments of types of rolling track in which the actual chains are replaced by flexible and resilient plates which match the outer shape of the tire.
Figure 11:
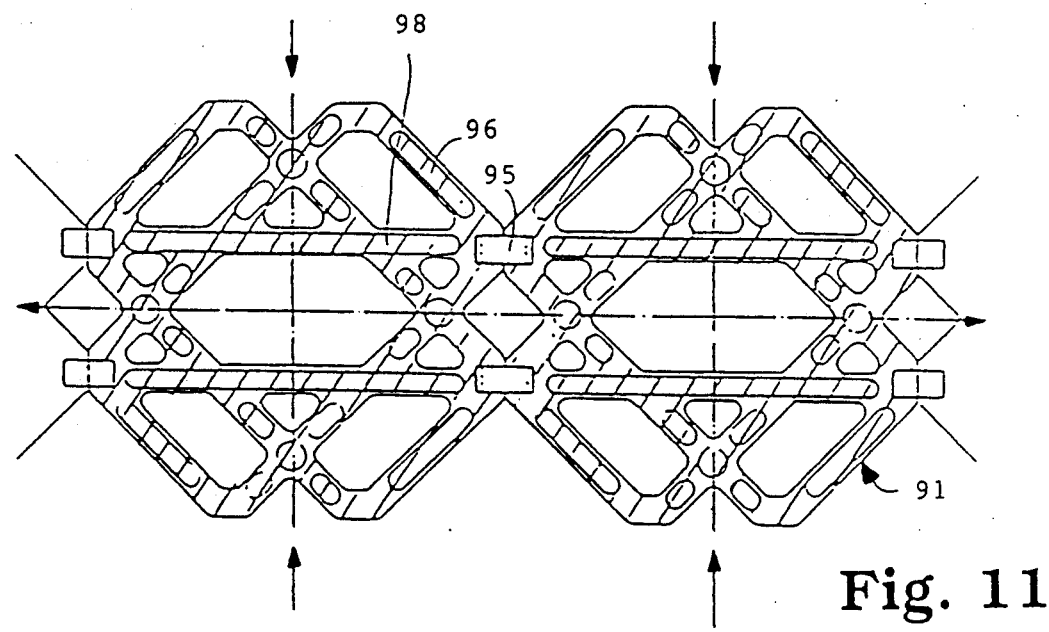

The rolling tracks in FIGS. 10 and 11 show another embodiment enabling the chain links and the bars to be replaced by elastomeric elements 90 cut out in plates 91 of lengths L, or in multiples of this length, produced in a plastic material, for example. In order to ensure the resilience of the assembly, inner cutouts 92, 93 will be provided, intended to create oblique tongues 94 disposed advantageously at 45° with respect to the rolling track. The oblique tongues 94 make an angle with respect to the axis of the rolling track so as to create a tension along the rolling track when the device is in place.

The plates 91 are joined by metallic rings 95. In an alternative embodiment, it is possible to provide linking pins passing through extensions provided for this purpose. It may also be advantageous for the linking elements to be resilient, as will be seen below.

It will also be noted that the plates 91 comprise ribs 96 and 97. The ribs 96 are disposed on the oblique tongues 94 while the ribs 97 extend perpendicularly to the axis of the rolling track virtually the entire width of the rolling track.

In FIG. 11, virtually the same elements 91 as above are seen again, rotated through 90° so that the ribs 98 are parallel to the axis of the rolling track. All the ribs 96 to 98 are intended to form shoes for gripping the ground.

In this manner, a rolling track is obtained which has a controlled resilience along the main axes, namely the axis of the rolling track and the transverse axis, as well as any intermediate axis, according to the inclination of the tongues.

Naturally, the resilient material used for the plates 91 must retain its resilient properties in times of extreme cold.

In an alternative embodiment which is not shown in the drawing, provision may be made for the intermediate bars 22 to be equipped with lateral extensions to avoid twisting, in a similar manner to the shoulders 34 and 35 of the chain guide.

Figure 12:
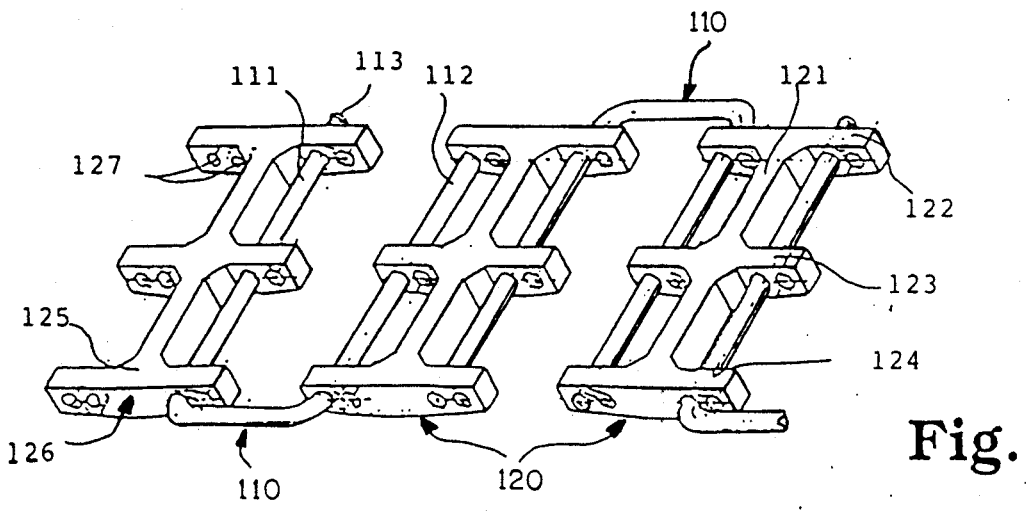
FIG. 12 is a perspective view of another embodiment of the rolling track consisting of resilient elements introduced between the nonflexible elements.

FIG. 12 shows a third embodiment of the rolling track comprising resilient linking elements 110 introduced between the nonflexible elements 120. The resilient elements 110 are metallic curvings whose resilience is ensured by the "U" shape. One of the arms 111 of the U is slightly longer than the other arm 112 and comprises, at its end 113, fastening means which will be described below.

The intermediate elements 120 comprise plates having a central part 121 whose length corresponds to the width of the rolling track. The central part 121 is extended on either side by three transverse wings 122, 123 and 124 intended to be applied against the tire. To this end, the upper face 125 is flat or slightly curved. The lower face 126 is rounded to a smaller radius, in a similar manner to the shoulders 34 and 35 of the chain guide.

Each cross piece 122, 123, or 124 comprises openings 127 for the passage of the arms 111 or 112 of the resilient element 110. In the alternative embodiment represented in the drawing, it will be noted that there are two openings 127 in each cross piece in order to permit the adjustment of the final length of the rolling track.

The plates 120 are preferably made from a non-resilient plastic material in order to avoid noise when the antiskid device is being used.

The end 113 of the "U" comprises means for anchoring the resilient elements 110 to the intermediate elements 120. Provision may be made for this fastening to be achieved using selflocking washers with nuts or pins.

Figure 13:
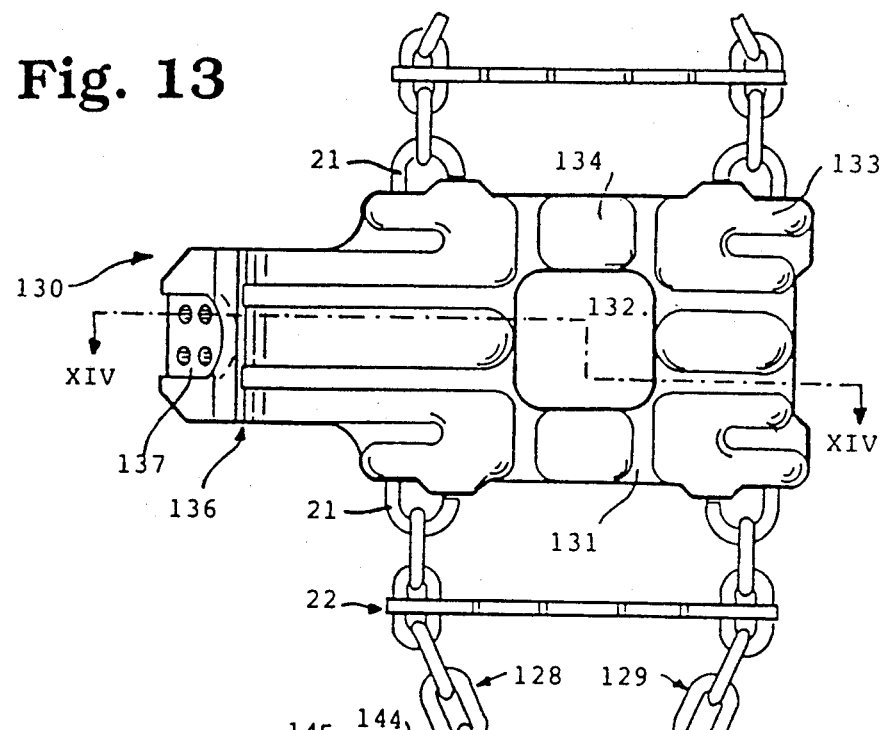
FIG. 13 is a plan representation of a rolling track with parallel chain elements between which are inserted in alternative forms a resilient plate, a resilient shuttle-shaped tensioning member, and a resilient plate constituting the chain guide.

The chain track shown in FIG. 13 comprises various types of elastomeric elements which may be used either separately or in combination, as shown in the drawing. This shows, in particular, a resilient plate 130 constituting the chain guide, a tensioning member 140 performing the same function as the spring 27 of FIG. 7 and a resilient plate 150, which are inserted between the chain elements 128 and 129, inserting, if desired, bars 22 as described above. These elastomeric elements are made from a material which retains its resilient properties even in extreme cold. Provision may be made for rubber reinforced with a fabric or nylon fibers to be used.

The chain guide plate 130 possesses a substantially flat part 131 intended to rest against the outer surface of the tire and having a central cutout 132 which increases the resilience of the assembly. On the face which may be seen in the drawing, which corresponds to that which is in contact with the ground, the plate comprises reliefs 133, 134 intended to constitute attack profiles for increasing grip with the ground. Rings 21 for linking to the chain elements are provided on each side of the plate.

Figure 14:
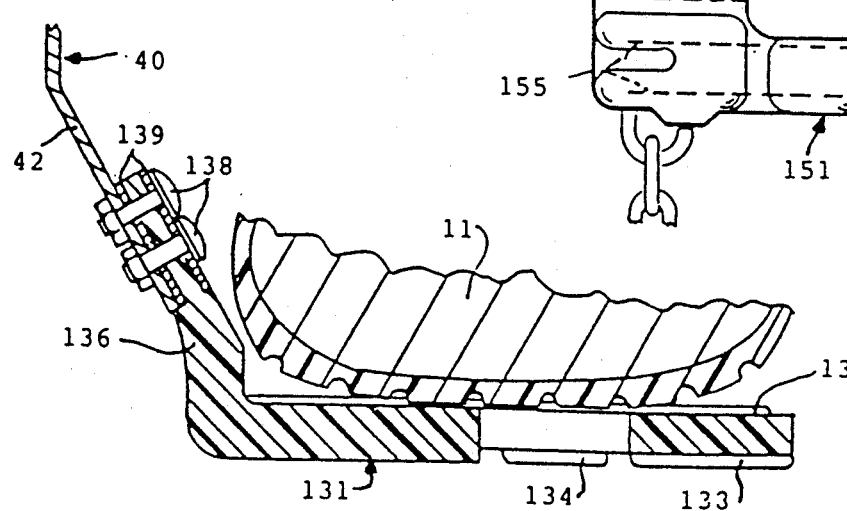
FIG. 14 is a sectional view according to XIV—XIV of FIG. 13 of the chain guide plate showing the linking elements at the end of an arm.

The chain guide plate 130 is represented in section in FIG. 14 where the transverse ribs 135 made in the face in contact with the tire will be noted. Each plate will advantageously comprise 5 to 6 parallel ribs 135. The plate 130 also comprises an arcuate lateral extension 136 whose end has a groove 137 intended to receive the outer bent part 42 of the arm 40. The plate 130 is fixed to the arm 40 by means of a screw 138 with a rounded head on the side of the tire 11. It is possible to reinforce the end of the plate by means of metallic inserts 139.

Provision may also may be made for an articulation between the arcuate extension and the outer part of the arm in any well known manner.

In FIG. 13, a tensioning member 140 in the shape of a shuttle fulfills the same role as the spring 27 in FIG. 7, namely traction between the chain elements 128 and 129. This tensioning member consists of a cylindrical central core 141 equipped at each end with a spherical head 142, 143. In order to permit the insertion of the tensioning member in the chain elements 128 and 129, the head 142 is equipped towards the outside with a tongue 144 having a hole 145 for the passage of a tool intended to pull the shuttle 140 into the links in question by deformation of the ball 142. The tongue 144 is then cut and it is for this reason that is has been represented in dotted lines in the drawing.

The plate 150, just like the plate 130 described above, comprises a rectangular body 151 having a central cutout 152. The plate 150 is equipped on one face with lugs 153, 154 for improving grip with the ground and on the opposite face with parallel ribs 155 intended to attack the tread of the tire in a transverse direction, which are represented in the drawing by dashed lines.

It will also be noted that in order to improve grip with the ground, the reliefs 133 or 135 are generally "U"-shaped, disposed symmetrically with respect to the axis of the rolling track.

The elements described here are assembled in the following manner before being made available to the user.

The rolling track 20 is constructed in a known manner according to one of the alternative embodiments described above.

(1) with chains 21 and spring elements 27, 28, 29 or 140 as well as bars 22 (see FIGS. 7 to 9 and 14, for example), (2) with flexible and resilient plates 91 or 150 (according to FIGS. 10 and 11), or (3) with rigid plates 120 inserted between the resilient elements (see FIG. 12).

Meanwhile, the four chain guides 30 or 130 are inserted at regular intervals, intermediate links 21 being inserted in the oblong openings 32 and 33. Obviously the length of a rolling track 20 of this type will be adapted to the various diameters of commercially available tires.

The link between one of the chain guides 30 and the corresponding arm 40 is a hinge consisting of a linking pin 38 disposed in the oblong opening 37, on the one hand, and the circular curving 44 on the other hand. The flexible plate 130 in FIGS. 13 and 14 permits a fixed linking to the arm 40 by means of a screw, for example. However, it is also possible to insert an articulation between the chain guide plate 130 and the arm, for example a loop acting with play with respect to the end of the arm.

The arms 40 are assembled in the central housing 50 by introducing the inner part 43 of each arm 40 into one of the straight grooves 55 and 56, while introducing the curved end 45 into one of the lateral recesses 57. It is now possible to appreciate the advantage of the series of parallel recesses 57 which permit the production of antiskid devices for various dimensions of wheels using identical components.

Tightening the screw 61 which constitutes the central shaft 60 into the corresponding nut 65 makes it possible to join together the two shells 51 and 52 of the housing 50, which consequently ensures fastening of the arms 40, as well as the return member 70 whose central opening 73 is disposed around the cylindrical shoulder 82 of the return plate 80.

As may be seen in FIG. 3, washers 62 to 64 are disposed between the components which have just been mentioned, which washers are intended to permit, on the one hand, a relative movement between the shells 51 and 52 of the housing and, on the other hand, a relative movement of the housing 50 with respect to the return plate 80 and to the resilient member 70 which is mounted thereon for reasons which will be explained below.

It should be noted that all the assemblies and adjustments mentioned hitherto may be performed in the factory, so that the seller no longer has to intervene.

When the device according to the invention is in a position when it is not being used, the arms 40 do not extend radially in the shape of a cross but are essentially superimposed in pairs by rotating one of the shells 51 or 52 with respect to the other. THe chain guides 30 are folded against the arms 40 and the rolling track 20 is disposed freely so the assembly is less bulky.

When the user has to position the antiskid device, he separates the arms 40 and arranges them in the shape of a cross. He then places part of the rolling track 20 on top of the wheel whilst positioning the arms 40 as shown in FIG. 1 so that two of the chain guides 30 are virtually in place.

He fixes the hooks 72 in openings or recesses of the wheel rim 12, which hooks have been previously passed into the openings 77 of the radial extensions 74 of the resilient return member 70, acting on the gripping members 76 provided for this purpose. The user need no longer check and adjust the tension of the rolling track since the latter is resilient.

When two or even four wheels are equipped in this manner, the user has only to roll the vehicle forwards or backwards so that the rolling track is automatically positioned on the periphery of the wheel, which happens by virtue of the specific shape given to the arms and to the chain guides which tend to dispose the rolling track opposite the periphery of the tire through the action of centrifugal force combined with the axial force of the return member. Obviously, several turns of the wheel are necessary before the rolling track is positioned on the tire, but the positioning is automatic; the user no longer has to intervene.

The lateral shoulders 34 or 35 of the guide chains 30 are, as has already been mentioned, of a height which is greater than or equal to the thickness of the rolling track 20. When they are squashed by the tire under the weight of the vehicle, they make it possible to avoid twisting of the hinge constituted by the sleeve 44, the opening 37 and the pin 39. The specialist knows how this articulation posed risks of deterioration and breakage. It will be noted that, when a chain guide is squashed by the tire, the oblong opening 37 permits a slight displacement of the arm in the axial direction.

By virtue of the resilience of the rolling track, it is guaranteed that an antiskid device is always in position despite the local deformations of the tire and without displacement of the chain guides 30 with respect to the arms 40.

When the device is moving, the elements preventing skidding are, according to the constructions, the chain links 21, the edge of the bars 22 (whose effect is accentuated by virtue of the cutouts 26), as well as the ribs 96 to 98 of the plates 91 or the lugs 133, 134, and 153, 154 of the plates 130 and 150 on which it is possible also to envisage metallic lugs being disposed.

It will also be noted that the relative movement between the resilient member 70 on the return plate 80 and the arms 40, which are attached to the central housing, permits a certain displacement of the rolling track with respect to the vehicle wheel.

In order to remove the antiskid devices, it suffices to detach the return member 70 from the wheel, to remove the rolling track and the chain guides located at the top of the tire and to move the vehicle slightly forwards or backwards to disengage the remainder of the rolling track.

It should become clear to one of ordinary skill in the art that the present invention is not limited to the preferred embodiments shown and described. Numerous changes and modifications may be made without departing from the scope and spirit of the invention.

What is claimed is:

1. An antiskid device for a vehicle wheel comprising:
   a movable antiskid rolling track on the periphery of the wheel;
   a central housing having a plurality of radial connecting arms extending therefrom;
   chain guides attached at a distal end of said radial connecting arms;
   said chain guides being inserted in said rolling track;
   a return means for automatically positioning said rolling track on the wheel and holding the rolling track on the periphery of the wheel;
   said rolling track comprising a plurality of resilient means, each of which is resilient in the longitudinal length of the rolling track, for pressing said rolling track against the peripheral surface of the wheel, thereby eliminating the play between the peripheral surface of the wheel and said antiskid rolling track.

2. The antiskid device according to claim 1, wherein said rolling track further comprises:
   at least two circles of chains forming sides of the rolling track; and
   a plurality of bars placed in a direction transverse to motion of the vehicle wheel, said bars being disposed between the sides at regular intervals along said track; and
   wherein each of said resilient means is inserted between two adjacent bars.

3. The antiskid device according to claim 2, wherein said bars comprise lateral means for avoiding twisting of the bar when the ground and the wheel are in contact.

4. The antiskid device according to claim 2, wherein each of said resilient means is a helical spring.

5. The antiskid device according to claim 4, wherein each of said resilient means is made from a resilient metal.

6. The antiskid device according to claim 4, wherein each of said resilient means is made from one of a synthetic material and rubber.

7. The antiskid device according to claim 2, wherein each of said resilient means is a ring.

8. The antiskid device according to claim 7, wherein each of said resilient means is made from a resilient metal.

9. The antiskid device according to claim 7, wherein each of said resilient means is made from one of a synthetic material and rubber.

10. The antiskid device according to claim 2, wherein each of said resilient means is a spring leaf.

11. The antiskid device according to claim 10, wherein each of said resilient means is made from a resilient metal.

12. The antiskid device according to claim 10, wherein each of said resilient means is made from one of a synthetic material and rubber.

13. The antiskid device according to claim 2, wherein each of said resilient means is an elastomeric plate.

14. The antiskid device according to claim 13, wherein each of said resilient means is made from one of a synthetic material and rubber.

15. The antiskid device according to claim 1, wherein said resilient means comprise flexible linking elements introduced between nonflexible elements.

16. An antiskid device for a vehicle wheel comprising:
    a movable antiskid rolling track on the periphery of the wheel;
    a central housing having a plurality of radial connecting arms extending therefrom;
    chain guides attached at a distal end of said radial connecting arms;
    said chain guides being inserted in said rolling track;
    a return means for automatically positioning said rolling track on the wheel and for holding the rolling track on the periphery of the wheel;
    said rolling track comprising
       resilient means for eliminating the play between the peripheral surface of the wheel and said antiskid rolling track, said resilient means comprising an elastomeric plate,
       at least two circles of chains forming sides of the rolling track, and
       a plurality of bars placed in a direction transverse to motion of the vehicle wheel, said bars being disposed between the sides at regular intervals along said track; and
    wherein the circles of chains are formed from links attached to said elastomeric plate, and said elastomeric plate comprises an extension having means for fastening to said radial connecting arm thereby forming said chain guide.

17. The antiskid device according to claim 16, wherein each of said resilient means is made from one of a synthetic material and rubber.

18. An antiskid device for a vehicle wheel comprising:
    a movable antiskid rolling track on the periphery of the wheel;
    a central housing having a plurality of radial connecting arms extending therefrom;
    chain guides attached at a distal end of said radial connecting arms;
    said chain guides being inserted in said rolling track;
    a return means for automatically positioning said rolling track on the wheel and holding the rolling track on the periphery of the wheel;
    said rolling track comprising
       resilient means for eliminating the play between the peripheral surface of the wheel and said antiskid rolling track, said resilient means comprising an elastomeric plate,
       at least two circles of chains forming sides of the rolling track, and
       a plurality of bars placed in a direction transverse to motion of the vehicle wheel, said bars being disposed between the sides at regular intervals along said track; and wherein said elastomeric plate comprises on one face lugs for improving a grip with the ground and on the opposite face parallel ribs intended to attack the tread of the wheel in the transverse direction.

19. An antiskid device for a vehicle wheel comprising:
 a movable antiskid rolling track on the periphery of the wheel;
 a central housing having a plurality of radial connecting arms extending therefrom;
 chain guides attached at a distal end of said radial connecting arms;
 said chain guides being inserted in said rolling track;
 a return means for automatically positioning said rolling track on the wheel and for holding the rolling track on the periphery of the wheel;
 said rolling track comprising resilient means for eliminating the play between the peripheral surface of the wheel and said antiskid rolling track;
 wherein said resilient means comprises flexible plates forming said rolling track.

20. The antiskid device according to claim 19, wherein said flexible plates are connected by metallic rings.

21. The antiskid device according to claim 19, wherein said flexible plates have inner cutouts, thereby creating oblique tongues to form an angle with respect to the motion of the vehicle wheel, the tongues being arranged so as to create tension along said rolling track.

22. The antiskid device according to claim 21, wherein the oblique tongues comprise rib means for ensuring grip with the ground.

23. The antiskid device according to claim 21, wherein the flexible plates comprise rib means for ensuring grip with the ground, which rib means are disposed transverse to the direction of motion of the vehicle wheel.

24. The antiskid device according to claim 23, wherein the plates comprise studs.

25. The antiskid device according to claim 21, wherein the flexible plates comprise rib means for ensuring grip with the ground, which rib means are disposed parallel to the direction of motion of the vehicle wheel.

26. An antiskid device for a vehicle wheel comprising:
 a movable antiskid rolling track on the periphery of the wheel;
 a central housing having a plurality of radial connecting arms extending therefrom;
 chain guides attached at a distal end of said radial connecting arms;
 said chain guides being inserted in said rolling track;
 a return means for automatically positioning said rolling track on the wheel and for holding the rolling track on the periphery of the wheel;
 said rolling track comprising resilient means for eliminating the play between the peripheral surface of the wheel and said antiskid rolling track, said resilient means comprising linking elements introduced between nonflexible elements, each of said linking elements having "U" shape, having two arms, each arm being attached to an adjacent nonflexible element.

27. The antiskid device according to claim 26, wherein at least one of said arms comprises means for anchoring in said adjacent nonflexible element.

28. An antiskid device for a vehicle wheel comprising:
 a movable antiskid rolling track on the periphery of the wheel;
 a central housing having a plurality of radial connecting arms extending therefrom;
 chain guides attached at a distal end of said radial connecting arms;
 said chain guides being inserted in said rolling track;
 a return means for automatically positioning said rolling track on the wheel and for holding the rolling track on the periphery of the wheel;
 said rolling track comprising resilient means for eliminating the play between the peripheral surface of the wheel and said antiskid rolling track, said resilient means comprising linking elements introduced between rigid elements;
 wherein said rigid elements comprise plates having a central part extended on either side by at least one transverse wing.

29. The antiskid device according to claim 28, wherein each wing comprises at least one opening for the passage of said linking element.

30. The antiskid device according to claim 28, wherein said rigid plates are made from a plastic material.

31. An antiskid device for a vehicle wheel comprising:
 a movable antiskid rolling track on the periphery of the wheel;
 a central housing having a plurality of radial connecting arms extending therefrom;
 chain guides attached at a distal end of said radial connecting arms;
 said chain guides being inserted in said rolling track;
 a return means for automatically positioning said rolling track on the wheel and for holding the rolling track on the periphery of the wheel;
 said rolling track comprising resilient means for eliminating the play between the peripheral surface of the wheel and said antiskid rolling track;
 wherein each of said chain guides disposed in the antiskid rolling track has at least one lateral means for avoiding twisting between said chain guide and said radial connecting arm when the ground and the wheel are in contact.

32. The antiskid device according to claim 31, wherein said lateral means are located on opposite side of said chain guide.

33. An antiskid device for a vehicle wheel comprising:
 a movable antiskid rolling track on the periphery of the wheel;
 a central housing having a plurality of radial connecting arms extending therefrom;
 chain guides attached at a distal end of said radial connecting arms;
 said chain guides being inserted in said rolling track;
 a return means for automatically positioning said rolling track on the wheel and for holding the rolling track on the periphery of the wheel;
 said rolling track comprising resilient means for eliminating the play between the peripheral surface of the wheel and said antiskid rolling track;
 wherein said central housing comprises two shells having two faces, each shell having, on one face, two parallel straight grooves for receiving an inner part of the radial connecting arms.

34. The antiskid device according to claim 33, wherein each groove has a series of parallel lateral recesses for receiving square curvings made in proximal ends of said radial connecting arm, thereby permitting matching with the dimensions of the wheel to be equipped.

35. The antiskid device according to claim 34, wherein the shells have a central opening for the passage of a central shaft and having on the face opposite the grooves, a circular recess receiving a washer.

36. The antiskid device according to claim 35, wherein the shells are identical.

* * * * *